July 20, 1954 C. P. LEBLOND ET AL 2,684,051
METABOLISM CAGE
Filed May 15, 1950 3 Sheets-Sheet 1
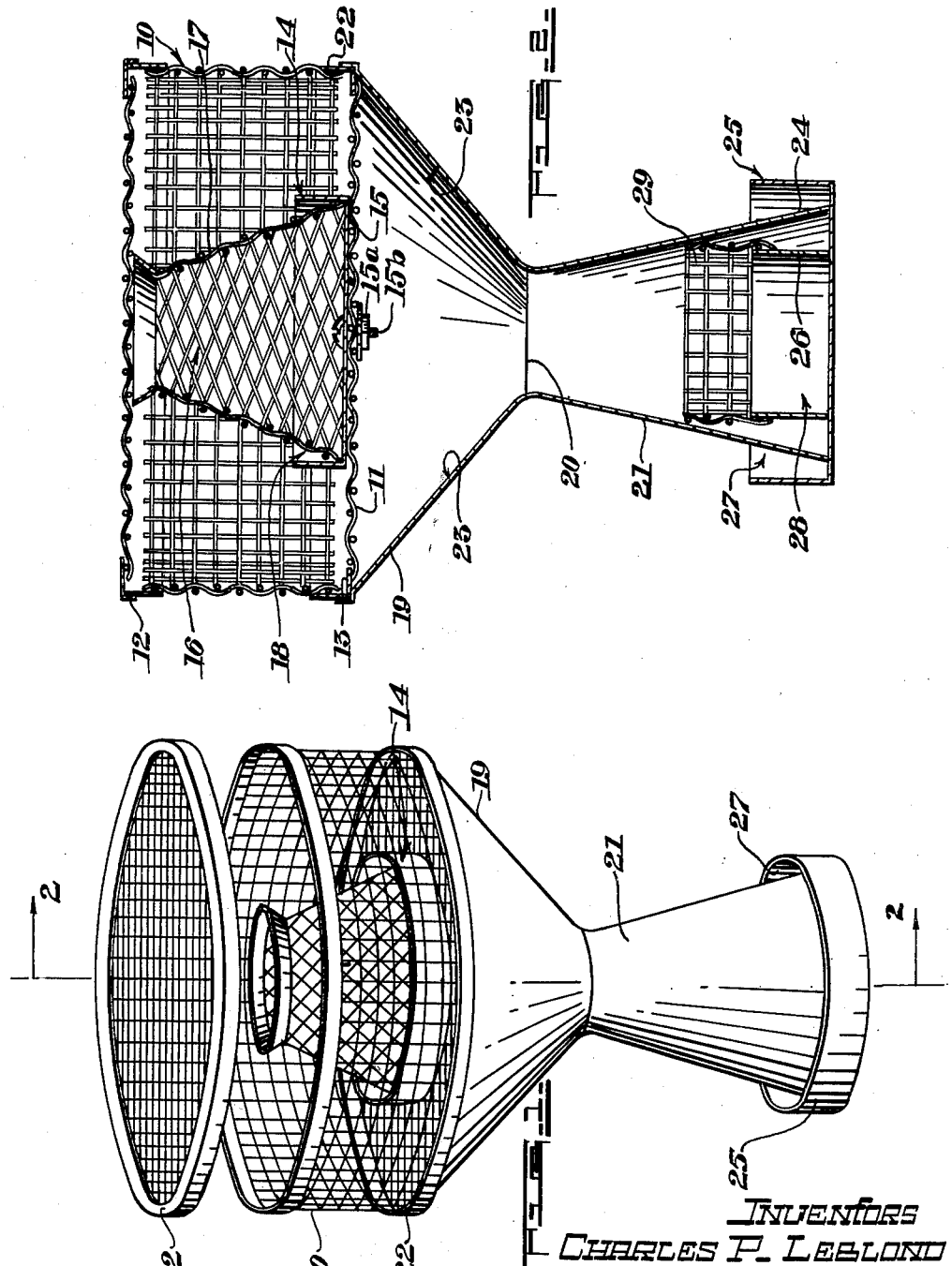

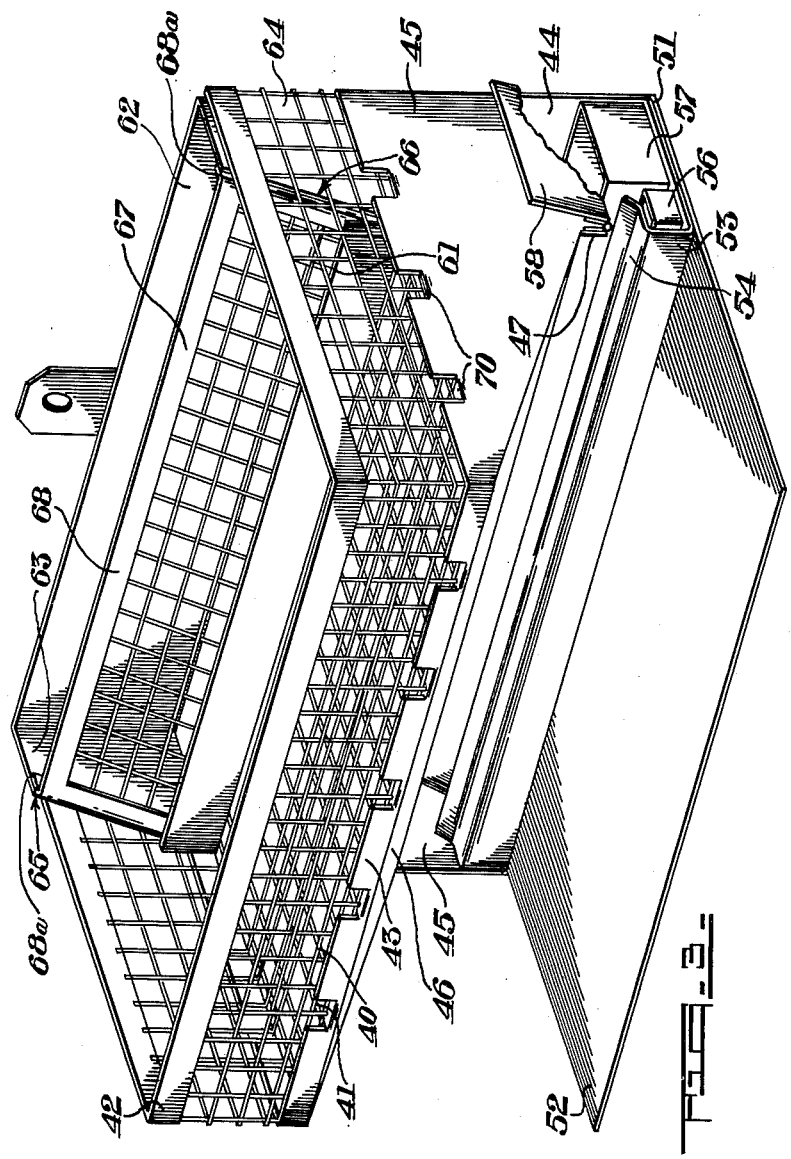

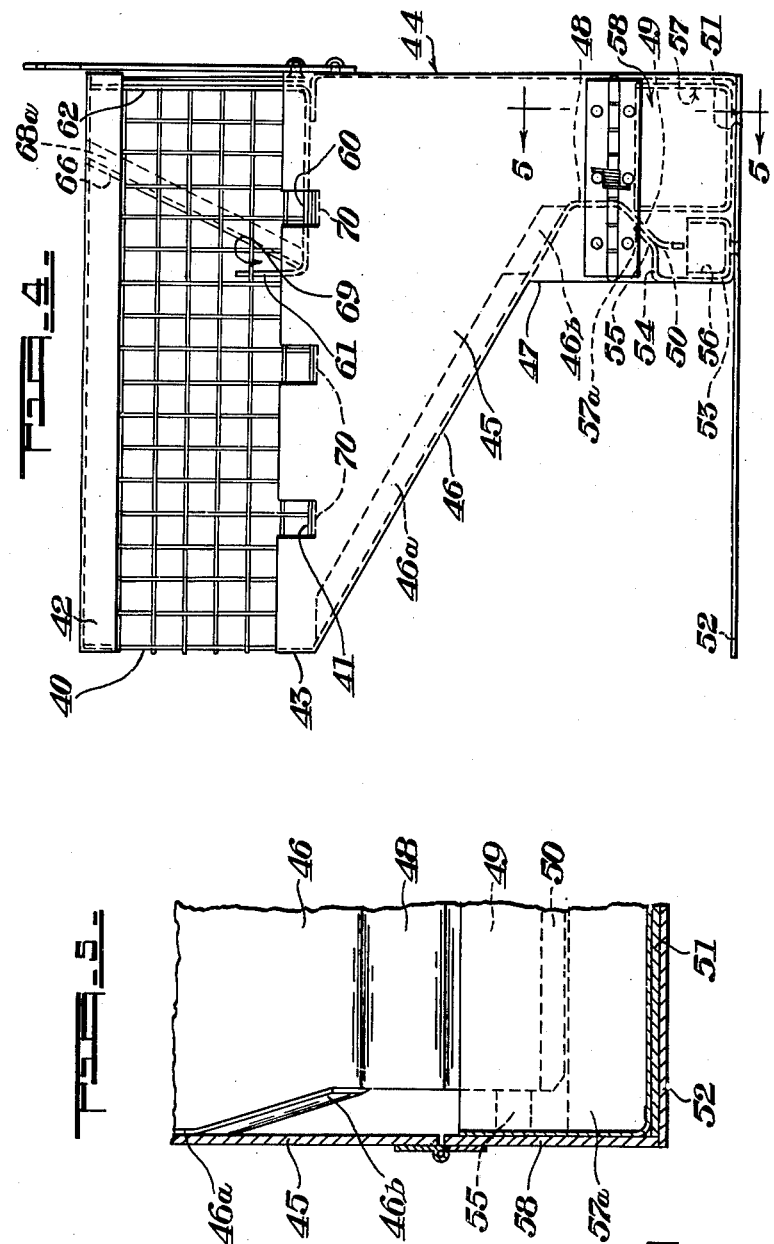

Patented July 20, 1954

2,684,051

UNITED STATES PATENT OFFICE 2,684,051

METABOLISM CAGE

Charles Philippe Leblond, Westmount, Quebec, Canada, and Samuel Albert, Detroit, Mich., assignors to The Honorary Advisory Council for Scientific and Industrial Research, Ottawa, Ontario, Canada Application May 15, 1950, Serial No. 161,978

10 Claims. (Cl. 119—17)

This invention relates to cages for confining animals such as mice, rats, guinea pigs, rabbits, etc., the subjects of laboratory studies, and in particular to a cage of the kind which is effective to separate the feces and the urine of such animals.

Animal cages of the above kind which are already in use generally employ a wire mesh floor which holds up the feces but allows the urine to pass therethrough. In such a cage, the feces are constantly washed by the urine and the resultant separation of the fecal and urinary material is not, therefore, very satisfactory.

An object of the present invention is to provide an improved animal cage by means of which a substantially improved separation of the fecal and urinary material may be achieved.

A further object of the invention is to provide feeding means in or for an animal cage which prevents the animal from scattering food over the floor of the cage thereby to reduce contamination of the fecal and urinary material by food particles. Such uncontaminated separation is desirable in metabolism studies and particularly when the animals are subjected to tracer experiments with radio-active elements.

The invention accordingly includes in an animal cage having a perforate floor to pass animal droppings, the provision below the floor, of a reversely bent downwardly sloping continuous surface to receive solid and fluid droppings from the floor, which surface is operable automatically under gravitational and liquid surface tension effects to guide solid and fluid droppings to separated locations.

Preferably, the cage includes a food container having a perforate wall permitting access of an animal to food behind the wall and means associated with said wall to receive food particles which escape through the wall and to prevent access of the animal to such food particles.

The foregoing and other objects and features of the invention will be apparent from the following description of alternative embodiments of the invention with reference to the accompanying drawings, in which:

Figure 1 is a perspective view of a generally cylindrical cage according to a first embodiment of the invention, Figure 2 is a vertical cross-section along lines 2—2 of Figure 1, Figure 3 is a perspective view of a generally rectangular cage according to a second embodiment of the invention, Figure 4 is an end elevation of the cage of Figure 3, and Figure 5 is a section on the line 5—5 of Figure 4, on an enlarged scale.

Referring first to Figures 1 and 2; the cage includes a perforate cylindrical wall 10, consisting for example of galvanised wire mesh having nine square openings to the square inch, and a separate perforate floor 11 consisting conveniently of galvanised wire mesh having four square openings to the square inch. The wall 10 and floor 11 together constitute a compartment in which the animal is confined, a perforate lid 12, which may also consist of galvanised wire mesh similar to the floor, being provided for closing the top of the compartment. Centrally disposed upon the floor 11 is a cylindrical food cup, comprising a low vertical imperforate rim 14 of sheet metal integral with an imperforate sheet metal floor 15, the cup being detachably secured to the floor 11 by a nut 15a and bolt 15b or other convenient fastening means. Within the food cup is arranged a food reservoir, indicated generally at 16, comprising a perforate frusto-conical wall 17, made, for example, of galvanised wire mesh having nine square openings to the square inch, the wall 17 being convergent upwardly above the floor 11 and fitting at its bottom margin closely adjacent to the rim 14 of the food cup at or near the junction of the rim with the floor 15. The wall 17 is preferably secured rigidly to the rim 14 or to the floor 15 as by soldering. By this arrangement, an annular, downwardly convergent trough 18 having a perforate inner wall is provided between the rim 14 and the lower end of the wall 17, which trough serves to receive small food particles escaping through the upper reaches of the wall 17 when the animal secures food at the reservoir 16. The downwardly tapering shape of the trough 18 effectively prevents the animal from picking up small food particles which fall into the trough and, in addition, the openings at the base of the wall 17 permit a proportion of those particles to re-enter the food reservoir at its base so further restricting access of the animal thereto. The rim 14 accordingly acts as a baffle to prevent the animal from scattering food particles over the perforate floor 11 and to prevent admixture of those particles with fecal and urinary material passing through the floor.

The upper end of the food reservoir 16 is open and is preferably waisted or funnel-shaped, as shown, to facilitate the introduction of the food thereinto.

The central arrangement of the food reservoir within the wall 10 provides an animal compartment which is annular in shape partitioned from the food in the reservoir by the perforate wall 17, and an effective floor area exposed to the animal and its droppings which is correspondingly ring-shaped.

The cage and food reservoir structure previously described is supported by a downwardly convergent frusto-conical imperforate sheet metal member 19 having a central aperture 20 at its lower end which opens into a downwardly divergent fluids-draining flange 21 of frusto-conical form. The member 19 is made with an upstanding rim 22 at its upper end which is constituted integrally with the perforate wall 10 as by soldering. The removable floor 11 is bounded by sheet metal ring 13 secured to the wire mesh floor, as by soldering, and the ring 13 is received within the rim 22 in close-fitting engagement therewith. Alternatively, if desired, the wall 10 and floor 11 could be assembled as an integral structure removably received in close-fitting engagement with the rim 22.

The inner surface of the member 19 constitutes a guide surface 23 for solids and fluids dropped through the perforate floor 11. As is best seen in Figure 2, the guide surface 23 slants downwardly from the outer margin of the floor 11 and terminates in an inner circular margin bounding the aperture 20 which lies beneath the imperforate floor 15 of the food cup 13. The guide surface 23 accordingly extends substantially beyond the inner margin of the effective area of the floor 11 considered as projected vertically downwards. Consequently, all droppings through the effective area of the perforate floor must first strike the surface 23 in descending towards the aperture 20.

The flange 21 terminates in an open-ended base 24 of relatively large diameter which provides a stable support for the overlying structure and animal confined therein. The base-portion 24 fits within a cylindrical vessel 25 having a concentric inner wall 26 subdividing the vessel into an outer annular receptacle 27 for urinary material and a central receptacle 28, located beneath the aperture 20, for fecal matter. A short cylindrical baffle 29 is preferably fitted coaxially within the draining flange 21 in adjustable engagement with the wall 26. The baffle 29 is of larger diameter than the aperture 20 and may be made of a perforate material, such as galvanised wire mesh having nine square openings to the square inch, or may consist of an imperforate material.

In the operation of the improved cage, droppings of the animal pass through the effective area of the perforate floor 11 and fall onto the guide surface 23. Solid droppings then slide or roll down the guide surface to the aperture 20 whence they drop under gravity through the baffle 29 into the central receptacle 30.

Urinary fluid on the other hand, passes through the floor 11 onto and flows down the surface 23 to the aperture 20 where, by virtue of surface tension effects, it continues to flow evenly around the surface of the aperture onto and down the inner surface of the draining flange 21 which directs the fluid outwardly into the annular receptacle 27. The guide surface 23 and the inner surface of the flange 21 preferably merge together in a smooth curve at the aperture 20 to assist in obtaining an even flow of urinary fluid through the aperture and to prevent the formation of droplets which might fall directly through the aperture into the central receptacle 28 therebeneath.

The baffle 29 is adjusted longitudinally of the wall 26 so that the upper end of the baffle lies close to but does not touch the inner surface of the draining flange 21. This closely spaced arrangement of the baffle 29 with the flange 21 serves to prevent the ingress to the annular receptacle 27 of fecal matter which may bounce off the guide surface 23 slantwise through the aperture 20.

The further embodiment of the invention shown in Figures 3, 4 and 5 is generally similar to that of Figures 1 and 2 but is arranged on a rectangular instead of a cylindrical plan. Thus, the cage is now constituted as a rectangular basket consisting of a perforate rectangular vertical surrounding wall 40 formed integrally with a perforate floor 41, both of wire mesh, the wall 40 being stiffened at its upper margin by a sheet metal rim 42. The cage is supported within the upper vertical rim 43 of a box-like structure comprising a vertical rear wall 44 integral with vertical, approximately triangular, end walls 45. Sloping downwardly towards the rear wall 44 from the rim 43 to forward vertical margins 47 of the end walls 45 is a front wall 46. Between the rim 43 and the margins 47, the wall 46 spans the walls 45 and is attached thereto through upwardly bent marginal flanges 46a. Beyond the margins 47, the wall 46 decreases in width to a vertical draining flange 48 which continues as a draining web 49 sloping in a direction opposite to that of the wall 46. The draining web 49 terminates in a vertical lower flange 50.

The ends of the front wall 46 in the region of decreasing width lying between the vertical margins 47 and the flange 48 diverge from the end walls 45 as shown in Figure 5 and each marginal flange 46a diverges therewith as a lip 46b which guides urine flowing from the upper reaches of the wall 46 away from the end walls 45. The wall 46 and parts 46a, 46b, 48 and 49 may conveniently consist of an integral sheet of imperforate metal appropriately bent.

At its base, the rear wall 44 is bent forward at right angles to provide a longitudinal panel 51 to which is attached a base plate 52 which extends forward under and longitudinally of the box-structure to provide a stable support for the overlying members. The forward end of the panel 51 is bent upwards at right angles as a front section 53, then rearwards at right angles to provide an overlying section 54, and then again upwards at an angle to provide an upwardly sloping flange 55 lying adjacent to and in a plane parallel to the depending draining web 49. The flange 55 and web 49 are preferably rigidly interconnected.

The lower end of the rear wall 44, the panel 51 and the front section 53 together constitute a channel, access to which may be had through a spring-loaded hinged door 58 at the lower end of the end wall 45. A long and narrow rectangular receptacle 56 is disposed within the aforesaid channel beneath flange 50 of the draining web 49 to receive urinary fluid from the entire length of the web while a larger rectangular receptacle 57 is arranged between the first receptacle and the rear wall 44 lengthwise thereof.

As will be seen more particularly from Figure 4, the receptacle 57 has a wall 57a which extends nearly to the draining web 49 and which lies slightly to the left of the vertical draining flange 48. The wall 57a is thus able to prevent the ingress of fecal matter to the urinary receptacle 56 similarly to the baffle 29 of the first embodiment.

In the present embodiment of the invention the food reservoir consists of a trough-shaped food container comprising a rectangular imperforate floor 60 integral with a low vertical front wall 61, a vertical rear wall 62 which extends to the top of the cage and vertical end walls 63 and 64 having forward edges 65 and 66 which extend upwardly from the junction of the front wall 61 and floor 60 and slope rearwardly over the floor 60. A longitudinal perforate partition 67 surrounded by a rim 68 extends between the edges 65 and 66 from top to bottom thereof. The partition 67 is either rigidly connected to marginal portions of the end walls 63 and 64 near their edges for example, by soldering bent-over end portions, such as 68a, thereto, or the rim of the partition may simply rest upon the sloping edges 65 and 66. The arrangement is such as to afford a longitudinal V-shaped trough 69 between the front wall 61 and the partition 67 which, as in the embodiment first described, serves to receive and to retain food particles escaping through the partition when the animal feeds at the food reservoir. Similarly, the front wall 61 acts as a baffle in preventing scattering of food over the perforate floor 41.

In order to obtain a good separation of fecal and urinary material it is important that the imperforate floor 60 should be at least as wide and preferably greater in width than the width of the gap between the flange 48 and the rear wall 44. In other words, the lower end of the sloping wall 46 should terminate at least at and preferably beyond a vertical projection thereon of the inner margin of the effective area of the perforate floor 41 bounded by the front wall 61 of the food container. In the present construction, this is accomplished as already described by continuing the wall 46 for some distance beyond the vertical margin 47 of the end walls so that the wall 46 extends well beneath the floor 60.

The cage is removably supported within the rim 43 by resting upon tabs 70 turned-in at right angles from the rim 43 at the opposite end walls. The cage is also provided with a removable perforate lid, not shown, which fits over the rim 42.

The operation of the device shown in Figures 3, 4 and 5 is similar to that of the first embodiment of the invention in that the solid droppings of the animal pass through the floor 61, fall onto the inner surface of the wall 46 and thence drop by gravity into the receptacle 57. Urinary fluid, however, flows first rearwardly down the surface of the wall 46, is guided at the lower reaches of the wall 46 away from the end walls 45 by the marginal lips 46b, and continues vertically down the flange 48 after which its angle of descent is reversed and it flows forwardly down the draining web 49 to the vertical flange 50 whence it drops into the receptacle 56.

In using a cage according to the invention, the food placed in the reservoir should be in the form of large cohesive pellets of a size larger than will pass through the mesh of the perforate walls 17 and 67. Large pellets of Purina Fox Chow have proved very satisfactory in this respect.

For the proper care of the caged animals, it is important to add food and to remove the feces and the urine every day. When filling the food reservoir it is advisable to remove it completely and to shake the food pellets loose of all small particles which operation need take only a few seconds.

What we claim as our invention is:

1. In a cage for laboratory animals comprising an animal compartment having a perforate floor to pass animal droppings, means automatically operable under gravitational and liquid surface tension effects to guide solid and fluid droppings through said floor to separate locations, comprising an imperforate downwardly sloping guide member vertically beneath said perforate floor, said guide member being at least co-extensive in area with a projection of said perforate floor thereon, and an imperforate fluids-draining element merging in a curve into said guide member at the lower edge thereof, said draining element being substantially co-extensive with said guide member at said curve and having at least a portion thereof sloping downwardly underneath said guide member.

2. A cage as claimed in claim 1, said guide member terminating at a lower margin lying substantially outside the projected area of said perforate floor.

3. A cage as claimed in claim 2, said guide member and fluids-draining element being integral.

4. In a cage for laboratory animals having an animal compartment with a perforate floor which is annular in shape to pass animal droppings, means automatically operable under gravitational and liquid surface tension effects to guide solid and fluid droppings through said floor to separate locations, comprising an imperforate, frusto-conical guide element sloping downwardly vertically beneath said floor to a central aperture, said guide element being at least coextensive in area with a projection of said floor thereupon, and an imperforate fluids-draining element carried at a lower margin of said guide element, said draining element sloping downwardly in a direction opposed to that of said guide element and having its upper surface portion meeting the lower surface portion of the guide element in a curve.

5. A cage as claimed in claim 4, said guide element and the draining element being integral and merging into each other in a curve at said central aperture, and said draining element being frusto-conical, diverging downwardly from said central aperture under said guide element.

6. A cage as claimed in claim 4 including a first receptacle to receive fluids from said draining element and a second receptacle within the area of said first receptacle to receive solid droppings from said central aperture.

7. A cage as claimed in claim 6, said first and second receptacles being integral with each other in a cylindrical concentric arrangement, said draining element terminating in a base portion receivable within said first receptacle to support the cage therefrom and a cylindrical baffle element in engagement with the cylindrical wall of said inner receptacle to prevent the passage of feces into said outer receptacle.

8. In a cage for laboratory animals comprising an animal compartment of generally rectangular shape and having a generally rectangular perforate floor to pass animal droppings, means automatically operable under gravitational and liquid surface tension effects to guide solid and fluid droppings through said floor to separate locations, comprising a substantially flat imperforate downwardly sloping guide member vertically beneath said perforate floor, said guide member being at least co-extensive in area with a projection of said perforate floor thereon, and an imperforate fluids-draining element merging in a curve into said guide member at the lower edge thereof, said draining element being substantially co-extensive in width with said guide member and having at least a portion thereof sloping downwardly underneath said guide member.

9. A cage as claimed in claim 8, the lower edge of said guide member merging with said draining element lying substantially outside the projected area of said perforate floor.

10. A cage as claimed in claim 9 including a first receptacle below said guide member and spaced back from the lower edge thereof in a position to receive fluids from said draining element, and a second receptacle positioned beneath the lower edge of said guide member to receive solid droppings therefrom.

References Cited in the file of this patent

UNITED STATES PATENTS

| Number | Name | Date |
|---|---|---|
| 404,565 | Schuyler | June 4, 1889 |
| 2,144,329 | Conlon et al. | Jan. 17, 1939 |
| 2,252,348 | Mager | Aug. 12, 1941 |
| 2,410,879 | Hegener | Nov. 12, 1946 |
| 2,528,404 | Wetzel, Sr. | Oct. 31, 1950 |

FOREIGN PATENTS

| Number | Country | Date |
|---|---|---|
| 5,648 | Great Britain | Aug. 15, 1912 |